(12) United States Patent
Poenaru et al.

(10) Patent No.: US 9,063,851 B2
(45) Date of Patent: Jun. 23, 2015

(54) FAIL SAFE CODE FUNCTIONALITY

(71) Applicant: Infineon Technologies AG, Neubiberg (DE)

(72) Inventors: Dragos Poenaru, Graz (AT); Thomas LeMense, Farmington, MI (US); Thomas Lange, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 247 days.

(21) Appl. No.: 13/670,976

(22) Filed: Nov. 7, 2012

(65) Prior Publication Data

US 2014/0129871 A1    May 8, 2014

(51) Int. Cl.
*G06F 11/00* (2006.01)
*G06F 11/07* (2006.01)
*G06F 11/08* (2006.01)

(52) U.S. Cl.
CPC ............... *G06F 11/07* (2013.01); *G06F 11/08* (2013.01)

(58) Field of Classification Search
CPC . G06F 11/0796; G06F 11/085; G06F 21/572; G06F 11/08; G06F 11/10; G06F 11/14; G06F 11/141; G06F 11/00; G06F 11/1004

USPC ........................................ 714/6.24, 54, 758
See application file for complete search history.

(56) References Cited

U.S. PATENT DOCUMENTS

| | | | |
|---|---|---|---|
| 7,555,678 B2 * | 6/2009 | Lai et al. .......................... 714/36 |
| 7,739,663 B2 * | 6/2010 | Newcomb, Jr. ............... 717/126 |
| 8,055,957 B2 * | 11/2011 | Kondo ........................... 714/710 |
| 2003/0163508 A1 * | 8/2003 | Goodman ...................... 709/100 |
| 2006/0236198 A1 * | 10/2006 | Lintz et al. .................... 714/758 |
| 2007/0038918 A1 * | 2/2007 | Andou ........................... 714/758 |
| 2009/0024899 A1 * | 1/2009 | Reid .............................. 714/758 |
| 2009/0199048 A1 * | 8/2009 | Aralakuppe Ramegowda et al. ............................... 714/54 |

* cited by examiner

*Primary Examiner* — Bryce Bonzo
*Assistant Examiner* — Elmira Mehrmanesh
(74) *Attorney, Agent, or Firm* — Eschweiler & Associates, LLC (57) ABSTRACT

Some aspects of the present disclosure provide for a system and method for fault mitigation of a non-volatile memory (NVM) store subject to error correction code (ECC) checking. A simple and robust means to test the integrity of failsafe code stored within the non-volatile memory prior to execution are disclosed. In some embodiments, the failsafe code comprises program elements to communicate the memory failure to other parts of the system, or to execute an orderly shutdown. In the event that an ECC error occurs, the failsafe code can be verified, and upon successful verification, executed.

20 Claims, 8 Drawing Sheets

FAIL SAFE CODE FUNCTIONALITY

BACKGROUND

In state of the art technologies for non-volatile memory (NVM), data bit corruption is commonplace. Error correction code (ECC) mechanisms are incorporated to detect and correct data bit errors within application code accessed from the NVM. ECC mechanisms can detect and correct all single bit errors and detect certain multiple bit errors. In the case that a non-correctable bit error within application code stored within the NVM has been detected by an ECC mechanism the application code cannot be executed safely.

DETAILED DESCRIPTION

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one skilled in the art, that one or more aspects described herein may be practiced with a lesser degree of these specific details. In other instances, known structures and devices are shown in block diagram form to facilitate understanding.

Figure 1:
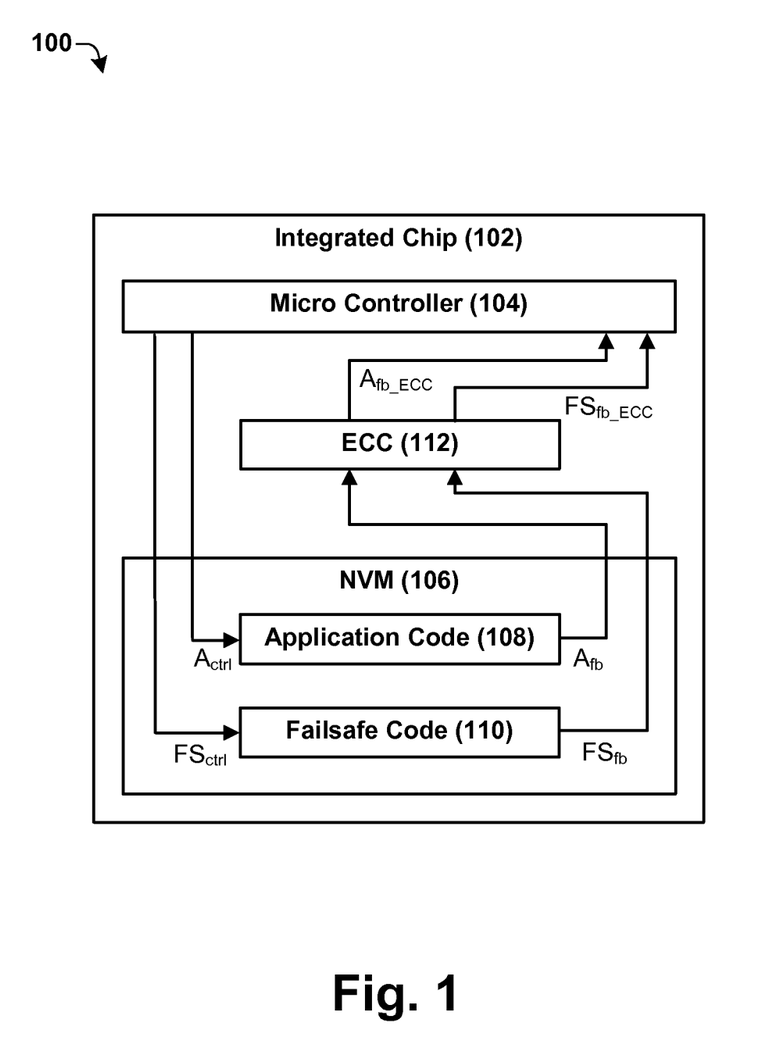
FIG. 1 illustrates a system comprising an integrated circuit with error correcting code hardware and failsafe code.

FIG. 1 illustrates a system 100 comprising an integrated chip (IC) 102, a microcontroller (μC) 104, and a first memory store 106 further comprising non-volatile memory (NVM) such as flash memory, electrically erasable programmable read-only memory (EEPROM), or magnetic storage. The first memory store 106 comprises writable memory to receive, store, and execute application code 108. The μC 104 is coupled to the first memory store 106 and can access the application code 108 through an application code control command $A_{ctrl}$ to receive all or a portion of the application code 108 as an application code feedback signal $A_{fb}$. The system 100 is autonomous (i.e., system 100 is neither controlled nor monitored by a user during operation) and has such applications as automobile safety systems, logistical systems such as tire pressure monitoring, and the like. Data-bit corruption of the application code 108 is commonplace in technologies comprising a first memory store 106 further comprising NVM, driving a need for error correcting code (ECC) mechanisms to identify and correct the data-bit corruption within the application code 108. For the programmable IC 102, the first memory store 106 further comprises failsafe code 110 configured to direct the system 100 in an event that non-correctable data-bit corruption is detected within the application code 108. To detect possible corruption, ECC hardware 112 resides within an interface between the first memory store 106 and the μC 104, and is configured to detect data bit corruption within the application code feedback signal $A_{fb}$, and correct data bit corruption when possible to produce a corrected application code feedback signal $A_{fb\_ECC}$.

ECC algorithms can detect and correct all single-bit errors, and detect certain multiple bit errors. In the case that a non-correctable bit error within the application code feedback signal $A_{fb}$ is detected by the ECC hardware 112, the application code 108 cannot be safely executed. The failsafe code 110 is then called to safely direct the programmable IC 102 though a fault mitigation protocol (e.g., system shutdown, system reboot, enter an infinite loop, etc.), through a failsafe code control command $FS_{ctrl}$. $FS_{ctrl}$ directs the NVM to send all or a portion of the failsafe code 110 to the μC 104 as a failsafe code feedback signal $FS_{fb}$, which also is passed through ECC hardware 112. However, because the ECC hardware 112 cannot detect all data bit error types, the failsafe code 110 may also be corrupted, even after ECC checking and correction to produce a corrected failsafe code feedback signal $FS_{fb\_ECC}$. A more robust solution may be to implement the failsafe code 110 in a more reliable form of memory, such as read-only memory (ROM). However, ROM-based solutions have the disadvantage that they are not flexible for different or adaptable ECC fault responses (i.e., ROM is non-programmable).

Accordingly, some aspects of the present disclosure provide for a system and method for fault mitigation of a NVM store subject to ECC checking. A simple and robust means to test the integrity of failsafe code stored within the NVM prior to execution are disclosed. In some embodiments, the failsafe code comprises program elements to communicate the memory failure to other parts of the system, or to execute an orderly shutdown. In the event that an ECC error occurs, the failsafe code can be verified, and upon successful verification, executed.

Figure 2:
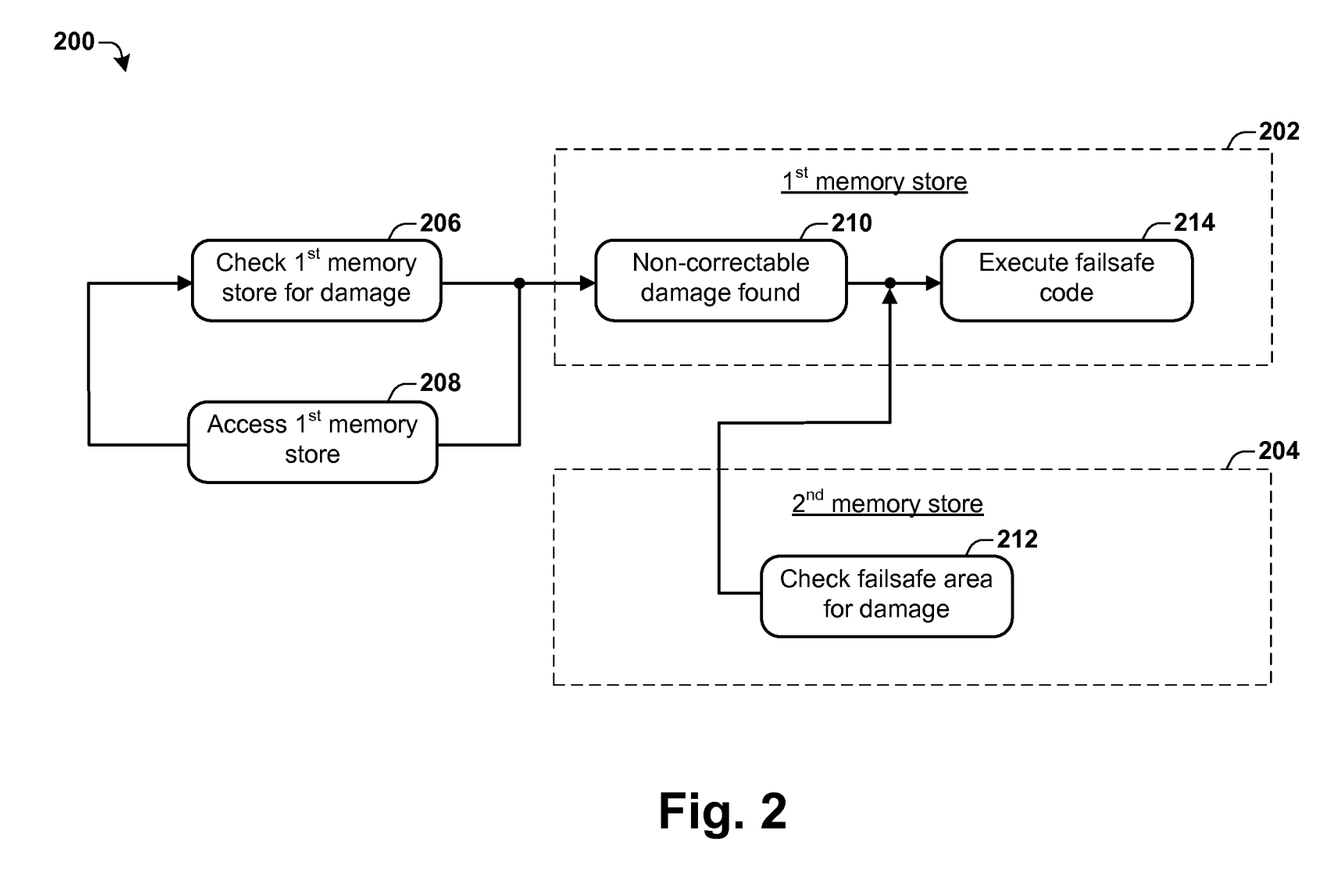
FIG. 2 illustrates a block diagram of some embodiments of a system configured to provide failsafe protection.

FIG. 2 illustrates a block diagram of some embodiments of a system 200 configured to provide failsafe protection. Application code is retrieved by a controller 208 from a first memory store 202 and simultaneously checked for damage by a first damage detection and correction interface 206. Instances of this damage detection and correction mechanism will only look for errors in the memory locations being accessed at a given point in time, unlike a continuous background scan, and does not check in areas of the first memory store 202 not being accessed. In some instances, the first damage detection and correction interface 206 locates non-correctable damage 210 within the first memory store 202, which prompts the system to engage in a fault mitigation protocol comprising execution failsafe code 214 directing the system to shut down. However, because the failsafe code is located within the first memory store 202, it may also be damaged. As such, prior to execution of the failsafe code 214, a second damage detection and correction interface 212 checks the failsafe code for damage, wherein the second damage detection and correction interface 212 is located within a second memory store 204 such that it is not affected by damage to the first memory store 202. Only if no non-correctable damage is found within the application code does the system execute the failsafe code 214.

Figure 3:
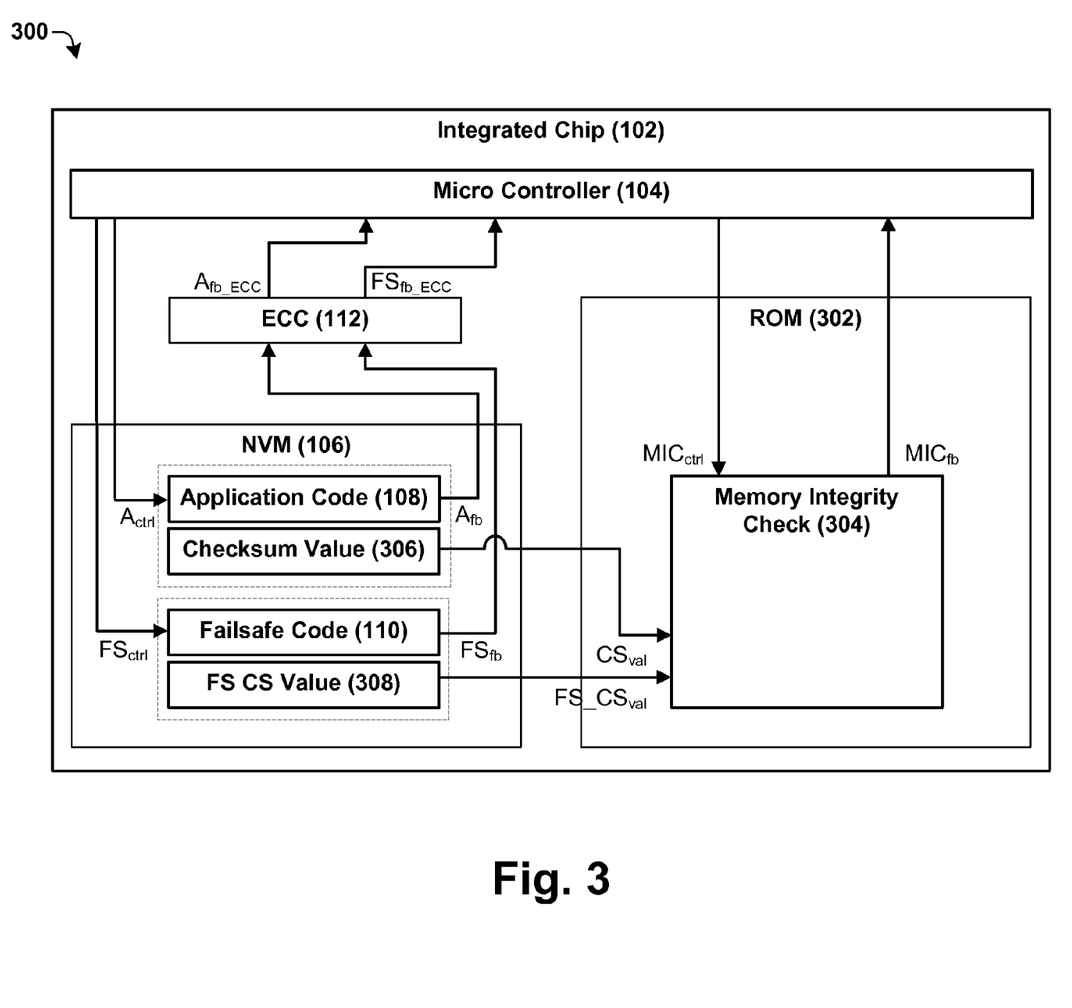
FIG. 3 illustrates some embodiments of a system configured to provide failsafe protection

FIG. 3 illustrates some embodiments of a system 300 configured to provide failsafe protection, comprising an IC 102 further comprising a first memory store 106 and a second memory store 302. The IC 102 further comprises a microcontroller (μC) 104 configured to provide instructions to various system components. The first memory store 106 further comprises NVM configured to store a plurality of data bits comprising application code 108 and failsafe code 110. The application code 108 may also include constant data, or application data, such that the application code 108 is not limited to being just instruction codes that are executable. The μC 104 is configured to access the application code 108 through an application control command $A_{ctrl}$, and to receive some or all of the application code 108 through application feedback signal $A_{fb}$. The μC 104 is further configured to also access the failsafe code 110 through a failsafe control command $FS_{ctrl}$ and receive some or all of the failsafe code 110 through failsafe feedback signal $FS_{fb}$.

The embodiments of the system 300 further comprise ECC hardware 112 coupled to outputs of the application code 108 and failsafe code 110. The ECC hardware 112 is configured to detect and correct possible corruption of one or more data bits within the application feedback signal $A_{fb}$ and failsafe feedback signal $FS_{fb}$, to produce an ECC-corrected application feedback signal $A_{fb\_ECC}$ and an ECC-corrected failsafe feedback signal $FS_{fb\_ECC}$, respectively. The ECC-corrected application feedback signal $A_{fb\_ECC}$ and the ECC-corrected failsafe feedback signal $FS_{fb\_ECC}$ further comprise an ECC failure status, comprising additional error bits (e.g., parity bits) indicating if one or more bit errors were discovered and corrected, if one or more bit errors were discovered and could not be corrected, etc. The additional error bits allow the μC 104 to determine the next course of action. In the event that a non-correctable bit error is detected in the application code 108, several possibilities arise. The ECC failure status does not automatically redirect execution to the failsafe code 110. Rather, the ECC failure status must be checked periodically by the application code 108 itself. In some embodiments, an automatic redirection to the failsafe code 110 may occur. In other embodiments the μC 104 may determine the "severity" of the ECC failure status before execution of the failsafe code 110.

The second memory store 306 further comprises ROM, which stores a memory integrity check 304 of the first memory store 106. By storing the memory integrity check 304 within a separate memory store, it is not affected by possible damage to the first memory store 106. Moreover, ROM provides a more robust form of memory storage. The memory integrity check 304 is configured verify the integrity of the failsafe code 110 in an event that non-repairable corruption of the one or more data bits comprising the application code 108 prompts the μC 104 to execute a failsafe protocol. The memory integrity check 304 is initiated by a memory integrity check control command $MIC_{ctrl}$ from the μC 104. As a first method of verification, the memory integrity check 304 directs the μC 104 to accesses the failsafe code 110 to determine if the ECC-corrected failsafe feedback signal $FS_{fb\_ECC}$ reports data bit corruption through the ECC failure status. Secondly, to reduce the chance that multiple bit fails have affected the failsafe code 110, the memory integrity check 304 is further configured to execute a checksum to verify the integrity of the failsafe code 110, wherein the checksum comprises a fixed-value datum, or numerical reference value, computed from the error-free failsafe code 110 and stored for future reference against subsequent checksum computations to check for data bit corruption of the failsafe code 110.

The checksum may be performed on both the application code 108 and the failsafe code 110. To initiate the checksum on the application code 108, the memory integrity check 304 receives a checksum value signal ($CS_{val}$) comprising information about a checksum value 306 that is stored within the first memory store 106. The checksum value 306 comprises a unique numerical value associated with error-free application code 108. In some embodiments, the checksum comprises a cyclic redundancy check (CRC) of the application code 108. Other embodiments of the checksum include parity byte or parity word algorithms, modular sum algorithms, etc, as is known to one of ordinary skill in the art. The checksum compares a calculated checksum value of the application code 108 with the (stored) checksum value 306. In some embodiments, the checksum value 306 resides within a third memory store (not shown) of the IC 102. The memory integrity check 304 then sends results of checksum to the μC 104 through a memory integrity check feedback signal $MIC_{fb}$. The memory integrity check 304 receives a failsafe checksum value signal ($FS\_CS_{val}$) comprising information about a failsafe checksum value 308 that is stored within the first memory store 106. In the event that the memory integrity check 304 determines that no damage exists to the failsafe code 110, the memory integrity check feedback signal $MIC_{fb}$ instructs the μC 104 that the failsafe code 110 may be safely executed. The μC 104 then executes the failsafe code 110 through the failsafe control command $FS_{ctrl}$. However, if the memory integrity check 304 determines that uncorrectable damage does exists to the failsafe code 110, the μC 104 instructs the application code 108 to initiate a failsafe protocol, which may comprise a system 300 reset, entering of an infinite loop, initiating a "limp home mode" or other limited functionality, or a shutdown depending upon details of the application code, error, and process being executed.

For the embodiments of FIG. 3 the first memory store 106 comprises NVM and the second memory store 306 comprises ROM. Other embodiments can comprise first and second memory stores which both comprise NVM. Still other embodiments can comprise a third memory store for a second failsafe area comprising NVM or ROM.

Figure 4A:
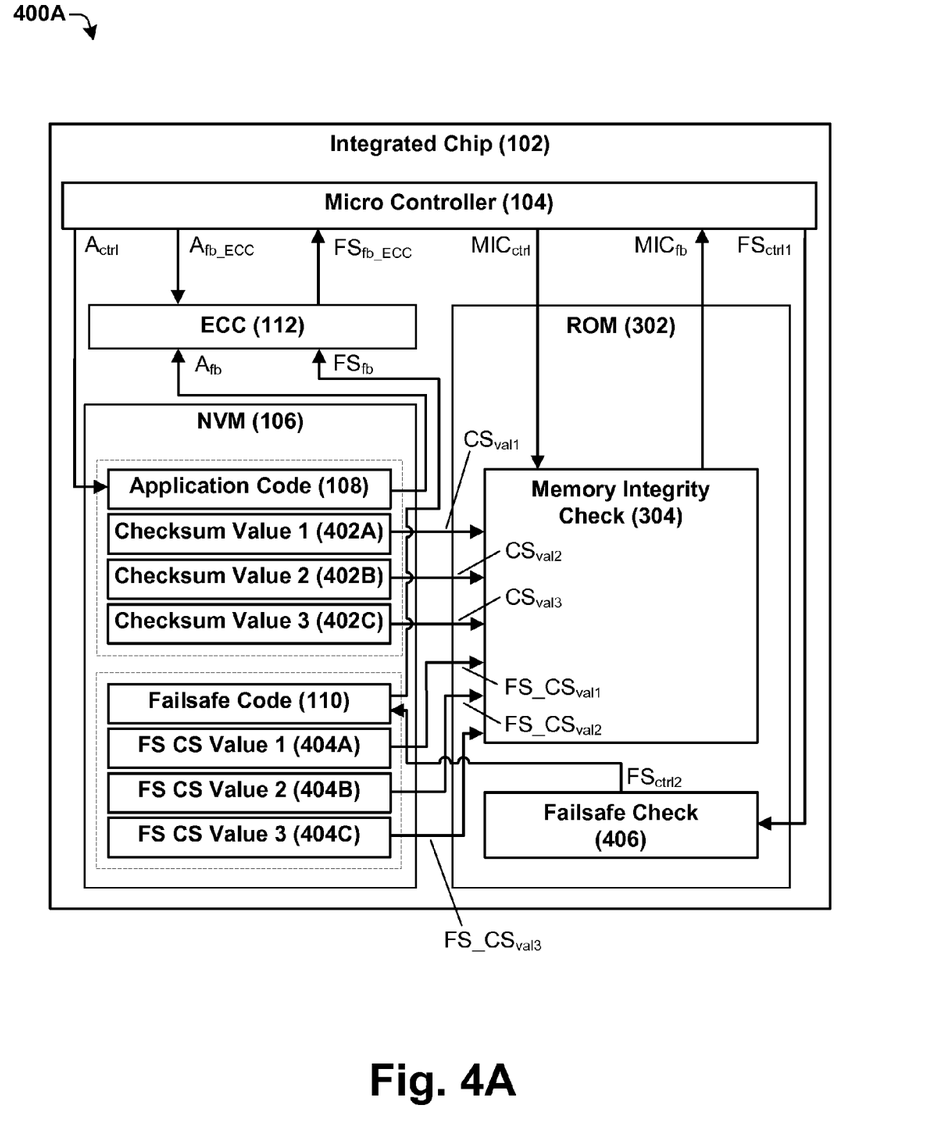
FIG. 4A illustrates some embodiments of a system configured to provide failsafe protection comprising redundant checksum values.

FIG. 4A illustrates some embodiments of a system 400A configured to provide failsafe protection, comprising an IC 102 further comprising a μC 104, a first memory store 106 comprising NVM, and a second memory store 302 comprising ROM to store a memory integrity check 304, as in the previous embodiments of FIG. 3. The first memory store 106 further comprises application code 108 and failsafe code 110. ECC hardware 112 is configured to check portions of the application code 108 and the failsafe code 110 to produce an ECC-corrected application feedback signal $A_{fb\_ECC}$ and an ECC-corrected failsafe feedback signal $FS_{fb\_ECC}$, respectively, through an ECC failure status comprising additional error bits.

The μC 104 accesses the failsafe check routine 406 through a first failsafe control signal $FS_{ctrl1}$, prompting the failsafe check routine 406 to access and execute the failsafe code 110 through a second failsafe control signal $FS_{ctrl2}$. The failsafe check routine 406 may comprise additional information allowing the μC 104 to gauge the severity of an ECC failure status received by the μC 104. Because the failsafe check routine 406 is stored in ROM, it may comprise portions of code that are unaltered from application to application. Whereas the failsafe code 110 stored in NVM may be altered for a given application. Moreover, failsafe check routine 406 may comprise portions of static code that can be coupled to multiple failsafe codes for differing applications.

When a non-correctable data bit error is found in the application code 108 that the μC 104 deems critical to system operation, the μC 104 executes a failsafe protocol comprising execution of failsafe code 110. The failsafe code 110 is ECC and checksum verified as described in the previous embodiments. However, computation of a checksum of the failsafe code 110 may be prone to false-negative results, wherein the failsafe code 110 contains no data bit corruption but the checksum determines that there is an error. This can occur because the checksum value (i.e., 306 in the embodiments of FIG. 3) has become corrupted rather than the failsafe code 110 itself. This is a consequence of storing the checksum value 306 in the NVM. One way to mitigate this is shown in the embodiments of FIG. 4A, wherein the first memory store 106 stores multiple copies of the failsafe checksum value: a first failsafe checksum value 406A, a second failsafe checksum value 406B, and a third failsafe checksum value 406C. The memory integrity check 304 accesses these three redundant checksum values through a first failsafe checksum value signal $FS\_CS_{val1}$, a second failsafe checksum value signal $FS\_CS_{va2}$, and a third failsafe checksum value signal $FS\_CS_{val3}$, respectively, and compares the three values. The memory integrity check 304 employs voting, wherein if one of the checksum values doesn't match the other two, it is discounted. A similar method is applied for the application code 108 for a first checksum value 402A, a checksum CRC value 402B, and a third checksum value 402C.

Figure 4B:
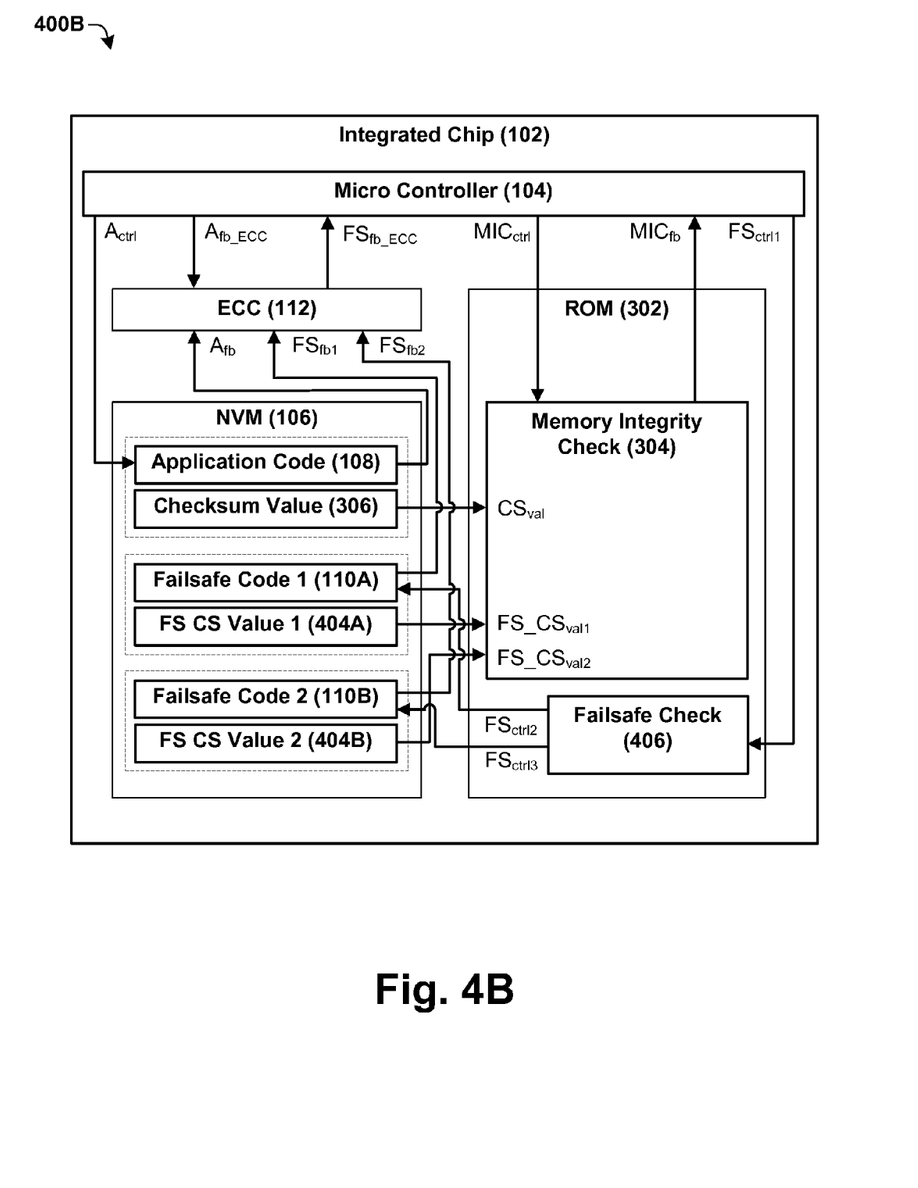
FIG. 4B illustrates some embodiments of a system configured to provide failsafe protection comprising redundant copies of failsafe code and redundant copies of checksum values.

Instances wherein the checksum determines that there is an error to failsafe code such that the failsafe code cannot be executed may be mitigated by storing multiple copies of failsafe code for execution, and in some instances storing multiple copies of the checksum value to resolve checking conflicts. FIG. 4B illustrates some embodiments of a system 400B configured to provide failsafe protection comprising redundant copies of failsafe code (110A and 110B) and redundant copies of checksum values (404A and 404B). The μC 104 accesses the failsafe check routine 406 through the first failsafe control signal $FS_{ctrl1}$, prompting the failsafe check routine 406 to access a first failsafe code copy 110A through a second failsafe control signal $FS_{ctrl2}$, or a second failsafe code copy 110B through a third failsafe control signal $FS_{ctrl3}$, independently. Prior to execution of the first failsafe code copy 110A or second failsafe code copy 110B, ECC (112) and a checksum is performed on a respective failsafe code copy (110A or 110B) in accordance with the methods described in the previous embodiments, wherein the first failsafe code copy 110A is checked against a first failsafe checksum value 406A, or the second failsafe code copy 110B is checked against a second failsafe checksum value 406B. If one of the first failsafe code copy 110A or second failsafe code copy 110B fails its respective checksum but the other passes, the passing failsafe code copy may be executed.

Note that for the embodiments of FIG. 4B the first failsafe code copy 110A or second failsafe code copy 110B may be checked against a common checksum value (i.e., the first failsafe checksum value 406A). Addition of the second failsafe checksum value 406B allows for verification of false-negative results resulting from corruption of a respective checksum value. Further embodiments may employ a cross-comparison, wherein the first failsafe code copy 110A is checked against a first failsafe checksum value 406A or the second failsafe checksum value 406B, and the second failsafe code copy 110B is checked against a first failsafe checksum value 406A or the second failsafe checksum value 406B. Such cross-comparisons allow for isolation of false-negative results in addition to recognizing corruption of a copy of the failsafe code (110A or 110B).

Figure 4C:
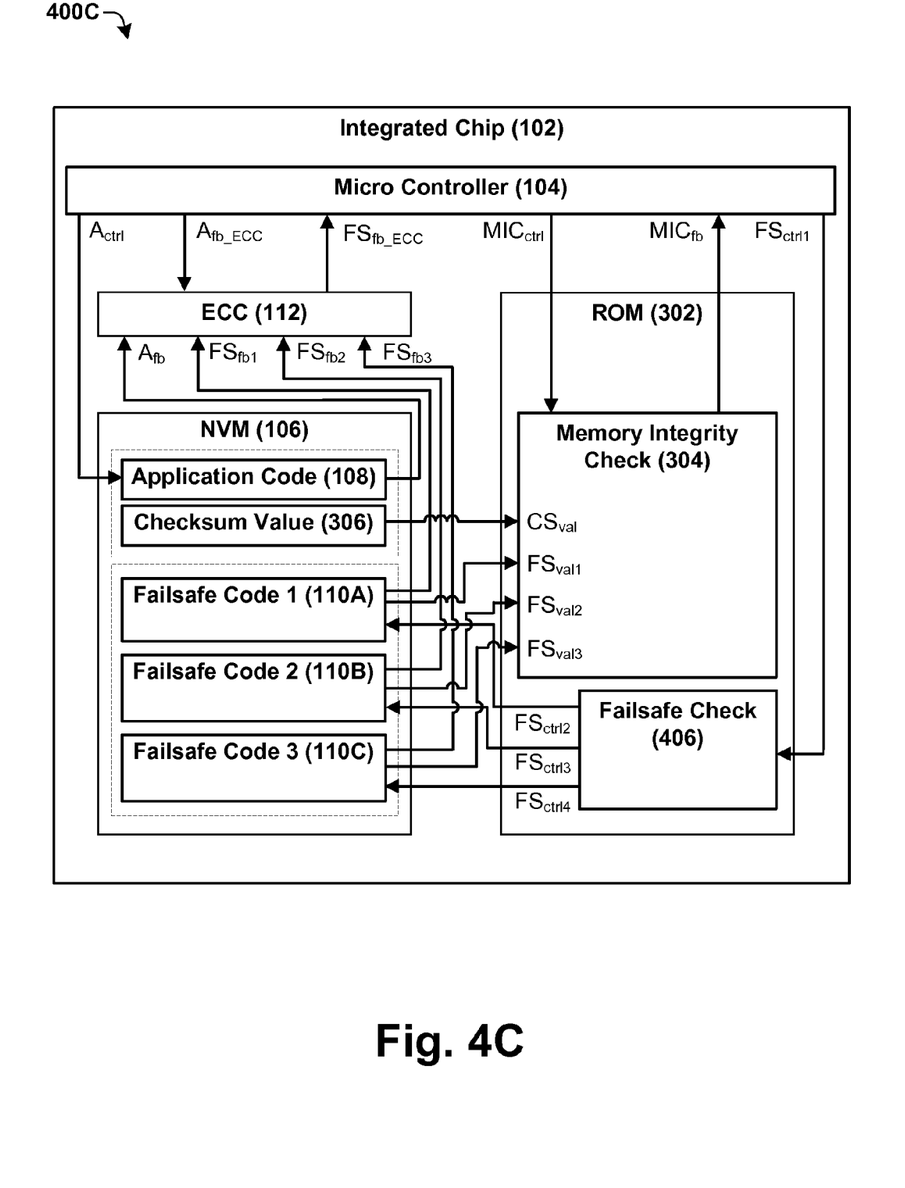
FIG. 4C illustrates some embodiments of a system configured to provide failsafe protection comprising multiple redundant copies of failsafe code.

In some embodiments, the checksum is circumvented by storing a copy of the failsafe code in the first memory store, comparing the failsafe code to the copy of the failsafe code byte-by-byte, and determining that there is no damage to the first failsafe area if the failsafe code and the copy of the failsafe code contain identical byte strings (i.e., they match byte-by-byte). FIG. 4C illustrates some embodiments of a system 400C configured to provide failsafe protection comprising multiple redundant copies of failsafe code (110A-110C). The failsafe check routine 406 accesses a first failsafe code copy 110A through a second failsafe control signal $FS_{ctrl2}$, a second failsafe code copy 110B through a third failsafe control signal $FS_{ctrl3}$, or a third failsafe code copy 110C through a fourth failsafe control signal $FS_{ctrl4}$, independently. Prior to execution of the first failsafe code copy 110A (e.g., a default copy for use), ECC (112) is performed. If ECC 112 detects corruption of the first failsafe code copy 110A, then each of the first failsafe code copy 110A, the second failsafe code copy 110B, and the third failsafe code copy 110C are compared to each other byte-by-byte. The failsafe check routine 406 determines that there is no damage to a respective copy of the failsafe code (110A-110C) if the respective copy of the failsafe code and at least half of the other copies of the failsafe code contain identical byte strings (i.e., if a majority of comparisons contain identical byte strings). The μC 104 then executes the respective copy of the failsafe code 110A-110C through the failsafe control command $FS_{ctrl2}$-$FS_{ctrl4}$, respectively. Although not as computationally efficient as the embodiments of FIG. 4A and FIG. 4B, the embodiments of FIG. 4C provide a robust means of comparison by checking each byte of data.

Figure 5:
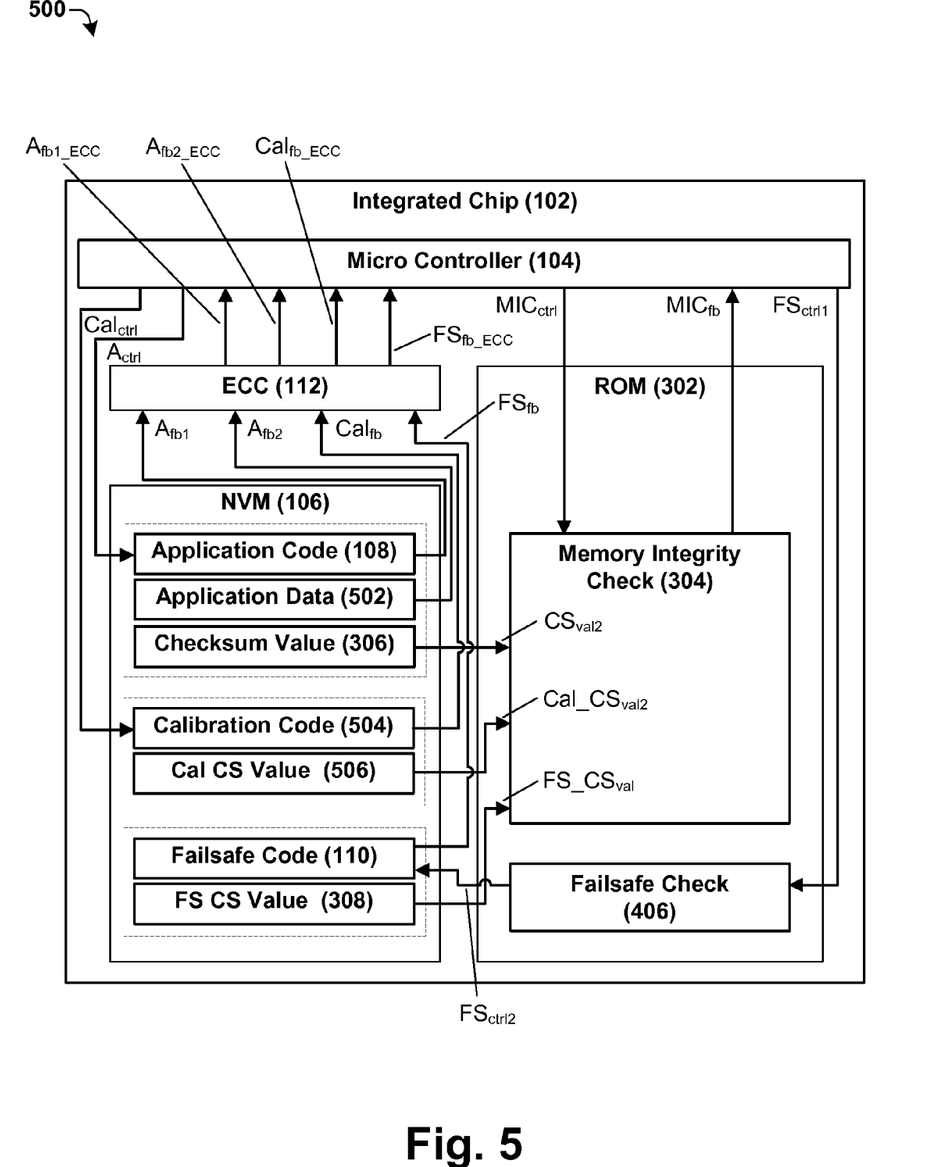
FIG. 5 illustrates some embodiments of a system configured to provide failsafe protection comprising multiple checksum values.

FIG. 5 illustrates some embodiments of a system 500 configured to provide failsafe protection, comprising an IC 102 further comprising a μC 104, a first memory store 106 comprising NVM, and a second memory store 302 comprising ROM to store a memory integrity check 304, as in the previous embodiments of FIG. 3 and FIG. 4. The first memory store 106 further comprises application code 108, application data 502 that is generated when the application code is running, calibration code 504 configured to initialize application code 108 settings during system 500 startup, and failsafe code 110.

ECC hardware 112 is configured to check portions of the application code 108, the application data 502, the calibration code 504, and the failsafe code 110 to produce a first ECC-corrected application feedback signal $A_{fb1\_ECC}$, a second ECC-corrected application feedback signal $A_{fb2\_ECC}$, a ECC-corrected calibration feedback signal $Cal_{fb\_ECC}$, and an ECC-corrected failsafe feedback signal $FS_{fb\_ECC}$, respectively, through an ECC failure status comprising additional error bits. An ECC failure status of the calibration code 504 reported to the μC 104 through the a ECC-corrected calibration feedback signal $Cal_{fb\_ECC}$ may result in execution of a fault mitigation protocol by the μC 104 prompting ECC and a checksum of the failsafe code 110, with subsequent execution of the failsafe code 110. Additionally, the application code 108 can make the determination during system 500 startup. The calibration code 504 is configured to check a computed checksum against a calibration checksum value 506 during startup. The application code 108 is configured to check a computed checksum against the checksum value 310 during startup, and when ECC hardware 112 detects data bit fails. Severe errors, errors that effect large portions of application code 108 or errors that impact multiple data bits of frequentlyused portions of application code 108, will be immediately detected by the ECC hardware 112. When the application code 108 attempts to check its own checksum against the checksum value 310, it will fail, prompting the system 500 to initiate a failsafe protocol.

Note that for the embodiments of FIG. 5 the application code 108 and application data 502 share one checksum value 306 (e.g., checksum), as normal operation of the system 500 will always produce the same application data 502. The calibration code 504 has a unique calibration checksum value 506 similar the failsafe code 110 and failsafe checksum value 308.

Figure 6:
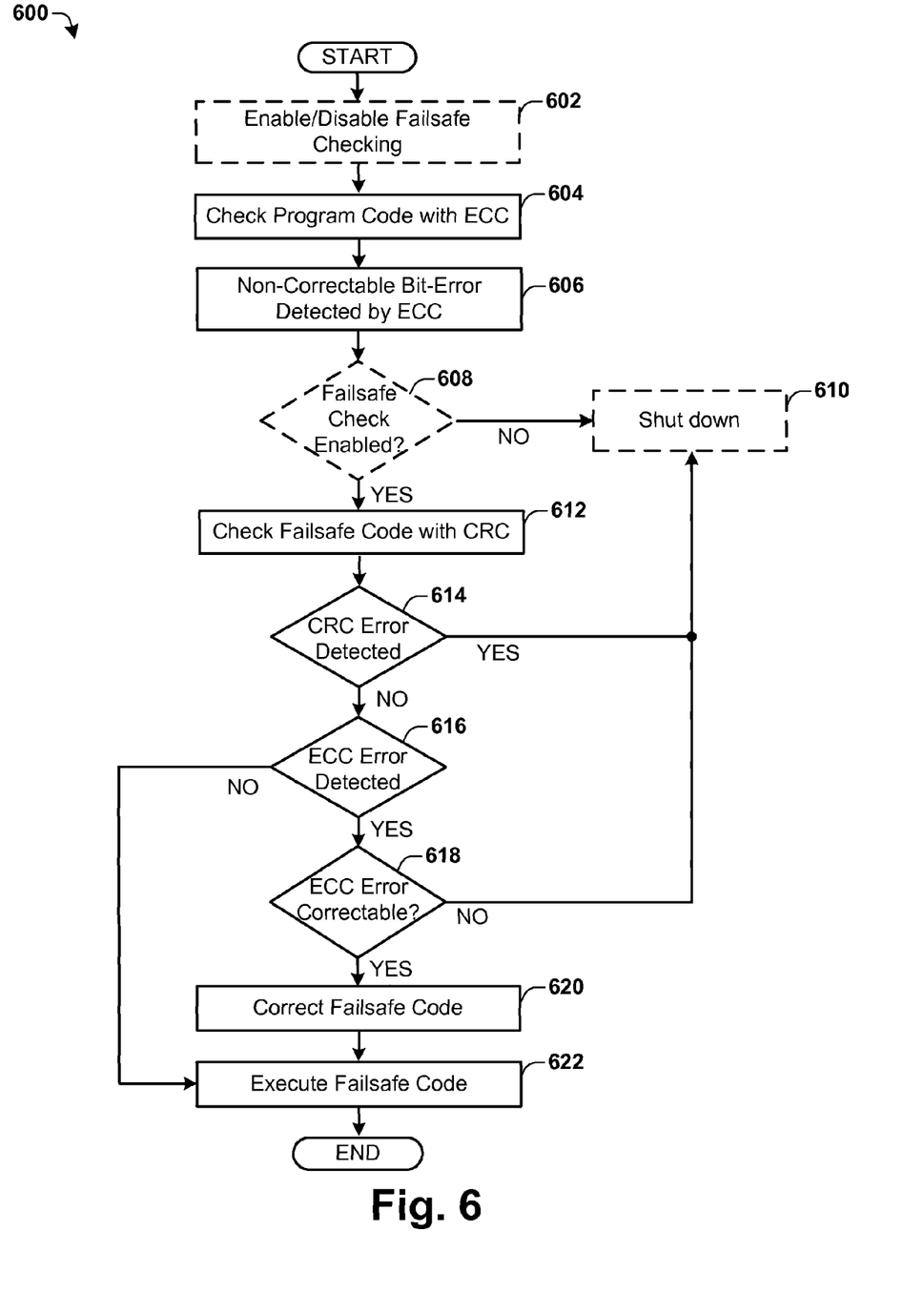
FIG. 6 illustrates a block diagram of some embodiments of a method of failsafe protection in a system.

FIG. 6 illustrates a block diagram of some embodiments of a method 600 of failsafe protection in a system. It will be appreciated that while the method 600 is illustrated and described as a series of acts or events, that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases. Furthermore, the disclosed methods may be implemented as an apparatus, or article of manufacture using standard programming and/or engineering techniques to produce software, firmware, hardware, or any combination thereof to control a computer to implement the disclosed subject matter.

At 602 a fault mitigation protocol is enabled through a user-specified command, the fault mitigation protocol comprising checking of a first failsafe area of a first memory store for damage with a second damage detection and correction mechanism located within a second memory store.

At 604 a program area comprising application code is checked for damage with a first damage detection and correction mechanism, wherein the first damage detection and correction mechanism comprises ECC hardware configured to check accessed portions of the application code for corruption, and to correct damage to the application code when possible.

At 606 a non-correctable bit error is detected within the application code, such that it cannot be safely executed.

At 608 a determination is made as to whether the fault mitigation protocol has been enabled in 602.

At 610 if the fault mitigation protocol is disabled, the system is reset, sent into an infinite loop, or shutdown depending upon details of the application code, error, and process being executed.

At 612 if the fault mitigation protocol is enabled, the failsafe code is checked for damage with the second damage detection and correction mechanism located within the second memory store, wherein the failsafe code is configured to direct the system if non-correctable damage is located within the application code.

At 614 the second damage detection and correction mechanism utilizes a calculated checksum on a plurality of data bits comprising the failsafe code stored within the first memory store. In some embodiments the calculated checksum comprises cyclic redundancy check (CRC) of the failsafe code and comparing a CRC value to a reference value stored in the first memory store. In some embodiments, a copy of the failsafe code is stored in the first memory store. The failsafe code is compared to the copy of the failsafe code byte-by-byte such that no damage to the failsafe code is recognized if the failsafe code and the copy of the failsafe code contain identical byte strings. If a bit error is detected within the failsafe code, then the system is reset, sent into an infinite loop, sent into a limited functionality mode, or shutdown (610).

At 616 if a bit error is not detected, the failsafe is checked with ECC. If no bit errors are detected within the failsafe code by the ECC, then the system proceeds to step 622 and executes the failsafe code.

At 618, if a bit error was detected in 616, and the bit error is not correctable, then the system is reset, sent into an infinite loop, or shutdown (610).

At 620 if one or more correctable bit errors are detected by the ECC, then the ECC corrects the one or more correctable bit errors within the failsafe code. In some embodiments, the fault mitigation protocol comprises checking the first failsafe area with ECC simultaneous to calculation of the checksum, and correcting damaged bits within the first failsafe area with ECC if the checksum detects no damage to the failsafe code.

At 622 the failsafe code is executed on the system.

It will be appreciated that equivalent alterations and/or modifications may occur to those skilled in the art based upon a reading and/or understanding of the specification and annexed drawings. The disclosure herein includes all such modifications and alterations and is generally not intended to be limited thereby. For example, although the figures provided herein, are illustrated and described to have a particular doping type, it will be appreciated that alternative doping types may be utilized as will be appreciated by one of ordinary skill in the art.

In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein.

What is claimed is:

1. A method of failsafe protection in a system, comprising:
   storing application code within a first memory store, wherein the application code is configured to direct the system;
   checking the application code for damage comprising corrupted data bits with a first damage detection and correction mechanism when the application code is retrieved from the first memory store;
   locating non-correctable damage to the application code, prompting execution of failsafe code located within the first memory store, wherein the failsafe code is configured to direct the system though a failsafe protocol;
   checking the failsafe code for damage with a second damage detection and correction mechanism, which is different from the first damage detection and correction mechanism; and
   executing the failsafe code if no damage to the failsafe code is found.

2. The method of claim 1, wherein the second damage detection and correction mechanism further comprises a checksum on a plurality of data bits comprising the failsafe code.

3. The method of claim 2, wherein the second damage detection and correction mechanism further comprises:

storing a copy of the failsafe code within the first memory store;
storing a first copy of a failsafe checksum value within the first memory store;
storing a second copy of the failsafe checksum value within the first memory store;
checking the failsafe code against the first copy of the failsafe checksum value with the checksum;
checking the copy of the failsafe code against the second copy of the failsafe checksum value with the checksum;
utilizing the failsafe code if the failsafe code and the first copy of the failsafe checksum value pass the checksum; and
utilizing the copy of the failsafe code if the failsafe code and the first copy of the failsafe checksum value fail the checksum, and the copy of the failsafe code and the second copy of the failsafe checksum value pass the checksum.

4. The method of claim 2, wherein the first damage detection and correction mechanism further comprises error correction code (ECC) hardware which is coupled to the application code or the failsafe code, wherein the ECC hardware is configured to detect and correct data bit errors within the application code or the failsafe code when the application code or the failsafe code is retrieved for the checksum.

5. The method of claim 4, wherein the checksum comprises a cyclic redundancy check (CRC) of the failsafe code further comprising a comparison of a first failsafe CRC value of the failsafe code calculated by CRC with a second failsafe CRC value stored within the first memory store.

6. The method of claim 5, wherein the CRC is stored within the second memory store.

7. The method of claim 1, wherein the second damage detection and correction mechanism further comprises:
storing three or more copies of the failsafe code within the first memory store;
comparing the three or more copies of the failsafe code to each other byte-by-byte; and
determining that there is no damage to a respective copy of the failsafe code if the respective copy of the failsafe code and at least half of remaining three or more copies of the failsafe code contain identical byte strings.

8. The method of claim 1, further comprising enabling or disabling checking of the failsafe code through a user-specified command, wherein disabling checking of the failsafe code comprises sending the system into a fault mitigation protocol comprising system shutdown, system reboot, limited system functionality, or entering an infinite loop.

9. A system configured to provide failsafe protection, comprising:
a first memory store comprising non-volatile memory and configured to store a plurality of data bits, the data bits comprising application code or failsafe code;
error correction code (ECC) hardware coupled to an output of the first memory store and configured to detect and correct data bit corruption within the application code or the failsafe code upon retrieval from the first memory store;
a second memory store comprising read-only memory and configured to store a memory integrity check of the first memory store, wherein the memory integrity check is configured to detect and correct the data bit corruption to the application code or the failsafe code; and
a controller configured receive a notification of the detected data bit corruption from the ECC hardware, to access the memory integrity check, and to execute the memory integrity check of the first memory store in an event that the ECC hardware detects, but cannot correct, the data bit corruption of the application code or failsafe code.

10. The system of claim 9, the memory integrity check comprising a checksum further comprising comparison of the plurality of data bits comprising the failsafe code to a failsafe checksum value stored within the first memory store.

11. The system of claim 10, wherein the memory integrity check is further configured to utilize the ECC hardware to detect and correct data bit errors within the failsafe code when the failsafe code is retrieved for the checksum.

12. The system of claim 11, wherein the checksum comprises a cyclic redundancy check (CRC) of the failsafe code further comprising a comparison of a first CRC value of the failsafe code calculated by CRC with a second CRC value stored within the first memory store.

13. The system of claim 10, the memory integrity check further comprising storing a copy of the failsafe code and comparing the failsafe code to the copy of the failsafe code byte-by-byte.

14. The system of claim 13, wherein the first memory store is configured to store a plurality of copies of the failsafe code, and wherein the memory integrity check comprises comparing the failsafe code to each copy of the failsafe code byte-by-byte, and disregarding instances where the failsafe code and a respective copy of the failsafe code do not contain identical byte strings if a majority of comparisons made between the failsafe code and respective copy of the failsafe code do contain identical byte strings.

15. A system configured to provide failsafe protection, comprising:
a first memory store comprising non-volatile memory and configured to store a plurality of data bits, the data bits comprising:
application code configured to direct the system; and
failsafe code configured to direct the system though a failsafe protocol;
error correction code (ECC) hardware coupled to an output of the first memory store and configured to detect and correct data bit corruption within the application code or the failsafe code; and
a second memory store comprising read-only memory and configured to store a plurality of data bits, the data bits comprising:
a checksum of the application code;
a failsafe check configured to access and direct the failsafe code in an event that the ECC hardware detects corruption of the one or more data bits comprising the application code; and
a memory integrity check configured to detect and correct the data bit corruption to the application code or the failsafe if the ECC hardware detects, but cannot correct, the data bit corruption of the application code or failsafe code.

16. The system of claim 15, further comprising a controller configured to access the application code failsafe code, checksum, and failsafe check, and to execute the checksum in an event that the ECC hardware detects corruption of the one or more data bits comprising the application code.

17. The system of claim 16, the memory integrity check comprising:
storing a first copy of the failsafe code within the first memory store;
storing a first failsafe checksum configured to verify correctness of the first copy of the failsafe code within the first memory store;

storing a second copy of the failsafe code within the first memory store; and storing a second failsafe checksum configured to verify correctness of the second copy of the failsafe code within the first memory store;

executing the first failsafe checksum against the first copy of the failsafe code with the controller, and executing the second failsafe checksum against the second copy of the failsafe code with the controller;

using the first copy of the failsafe code if the first copy of the failsafe code passes the first failsafe checksum; and using the second copy of the failsafe code if the first copy of the failsafe code fails the first failsafe checksum, but the second copy of the failsafe code passes the second failsafe checksum.

18. The system of claim 15, further configured to enter a fault mitigation protocol comprising system shutdown, limited functionality, system reboot, or entering an infinite loop if the ECC hardware detects non-correctable errors in the failsafe code.

19. The system of claim 18, wherein the application code is further configured to perform a checksum of the application code against the checksum value and to initiate the failsafe check if a checksum comparison between the application code and the checksum value fails to produce identical results.

20. The system of claim 15, the memory integrity check comprising:

storing a plurality of copies of the failsafe code;

comparing the failsafe code to one or more copies of the failsafe code byte-by-byte; and disregarding instances where the failsafe code and a respective copy of the failsafe code do not contain identical byte strings if a majority of comparisons made between the failsafe code and respective copy of the failsafe code do contain identical byte strings.

\* \* \* \* \*